United States Patent
Tokuhiro et al.

(10) Patent No.: US 8,547,279 B2
(45) Date of Patent: Oct. 1, 2013

(54) INCOMING WAVE CLASSIFYING AND DISTINGUISHING DEVICE, INCOMING WAVE CLASSIFYING AND DISTINGUISHING METHOD, ORIGINATING POSITION ESTIMATING DEVICE AND ORIGINATING POSITION ESTIMATING METHOD

(75) Inventors: Takafumi Tokuhiro, Kanagawa (JP); Takashi Motoyama, Kanagawa (JP); Yutaka Saito, Ishikawa (JP)

(73) Assignee: Panasonic Corporation, Osaka (JP)

( * ) Notice: Subject to any disclaimer, the term of this patent is extended or adjusted under 35 U.S.C. 154(b) by 256 days.

(21) Appl. No.: 13/122,126

(22) PCT Filed: Oct. 1, 2009

(86) PCT No.: PCT/JP2009/005078
§ 371 (c)(1),
(2), (4) Date: Mar. 31, 2011

(87) PCT Pub. No.: WO2010/038468
PCT Pub. Date: Apr. 8, 2010

(65) Prior Publication Data
US 2011/0181472 A1    Jul. 28, 2011

(30) Foreign Application Priority Data

Oct. 3, 2008 (JP) ................................. 2008-258918

(51) Int. Cl.
*G01S 3/02* (2006.01)
(52) U.S. Cl.
USPC ...................................................... 342/453
(58) Field of Classification Search
USPC ...................................................... 342/453
See application file for complete search history.

(56) References Cited

U.S. PATENT DOCUMENTS

| 6,246,339 B1 | 6/2001 | Yamazaki |
| 2007/0176749 A1* | 8/2007 | Boyd ........................ 340/10.1 |

FOREIGN PATENT DOCUMENTS

| JP | 56-18767 | 2/1981 |
| JP | 11-118898 | 4/1999 |
| JP | 11-353591 | 12/1999 |
| JP | 2000-28714 | 1/2000 |
| JP | 2007-249911 | 9/2007 |
| JP | 2008-186274 | 8/2008 |

OTHER PUBLICATIONS

International Search Report dated Dec. 25, 2009.

* cited by examiner

*Primary Examiner* — Harry Liu
(74) *Attorney, Agent, or Firm* — Dickinson Wright PLLC

(57) ABSTRACT

Provided are a device and a method that can classify an incoming wave and can correctly distinguish the position of an originating device, even in a multipath environment. A principal vertically polarized wave arrival direction sensing unit (104-1) and a principal horizontally polarized wave arrival direction sensing unit (104-2) respectively sense the arrival direction of a principal wave by sensing the arrival direction in which the maximum reception level is obtained. An incoming wave classifying decision unit (108) determines that a direct wave has arrived when the difference between the principal wave arrival direction sensed by the principal vertically polarized wave arrival direction sensing unit (104-1) and the principal wave arrival direction sensed by the principal horizontally polarized wave arrival direction sensing unit (104-2) is within a prescribed threshold value, and determines that a direct wave has not arrived when the difference is greater than the threshold value.

12 Claims, 9 Drawing Sheets

INCOMING WAVE CLASSIFYING AND DISTINGUISHING DEVICE, INCOMING WAVE CLASSIFYING AND DISTINGUISHING METHOD, ORIGINATING POSITION ESTIMATING DEVICE AND ORIGINATING POSITION ESTIMATING METHOD

TECHNICAL FIELD

The present invention relates to an apparatus and a method for classifying and distinguishing an incoming wave and an apparatus and a method for estimating an originating position that can estimate the direction of a source of an originated radio wave even in a multipath environment.

BACKGROUND ART

Methods for estimating the direction of a source of a radio wave by detecting the arrival direction of the radio wave are conventionally proposed and also put to practical use. Simply, when visibility is secured between the source of a radio wave and an observation position, a direct radio wave (hereinafter referred to as "direct wave") arrives from the source and there is no reflector that reflects the radio wave in neighborhood, the source can be said to exist in the direction from which the radio wave arrives.

However, in a multipath environment, radio waves arrive by repeating reflections and diffractions through buildings or the like in a complicated way. For this reason, even when a radio wave is originated from a single source, radio waves arrive at an observation point (receiving point) from a plurality of directions (multicarriers arrive), and therefore it is difficult to simply estimate the direction and position of the source from the arrival direction of the radio wave.

As an application example of an originating position estimating apparatus that estimates the position of the source based on the arrival direction of the radio wave, for example, such an apparatus may be mounted on a vehicle. In this case, the originating position estimating apparatus identifies the position of a collision avoidance target such as a pedestrian or the like by estimating the position of a transmitter carried by the pedestrian. Thus, even when the collision avoidance target such as pedestrian is located out of sight from the vehicle, it is assumed to be possible to prevent traffic accident by letting the driver recognize the presence of the pedestrian or the like or controlling the vehicle according to the position of the pedestrian or the like.

Patent literature 1 describes an apparatus that displays the arrival direction of a radio wave assuming that a pedestrian or the like is located in the arrival direction of a radio wave and thereby allows the driver to recognize the presence of the pedestrian. To be more specific, a synthesized image as shown in FIG. 1A is obtained by estimating the arrival direction of the radio wave, applying imaging processing to the incoming radio wave and synthesizing the image with a background image separately acquired by a camera or the like. This synthesized image is displayed on car navigation or the like and the driver looking at the synthesized image can visually recognize the position of a collision avoidance target.

However, although the radio wave arrival direction substantially coincides with the direction of the source (pedestrian or the like) in a good visibility environment, the radio wave arrival direction often does not coincide with the direction of the source (pedestrian or the like) in a multipath environment. That is, the source (pedestrian or the like) may not always be located in the radio wave arrival direction in the multipath environment.

For example, when there is a wall surface such as building B in FIG. 1B which becomes a cause of multipath, in addition to a diffracted wave, radio waves come from directions which have nothing to do with the position of a pedestrian. This makes it difficult to estimate the correct position of the pedestrian. Due to the existence of many reflectors such as buildings, a road environment is generally a multipath environment. Therefore, a technique is required which accurately estimates an originating position of a radio wave when multiplexed propagation waves arrive.

Patent literature 2 proposes an apparatus that accurately finds out the arrival direction of a radio wave from a mobile body that originates only a vertical polarized wave in a situation in which there are waves reflected by a mountain or the like. This apparatus includes an azimuth measuring receiver that measures electric field strength and azimuth of a vertical polarized wave front of a received wave, a horizontal polarized wave receiver that measures electric field strength and azimuth of a horizontal polarized wave front of the received wave and an azimuth correction circuit that compares a ratio of the electric field strength of the vertical polarized wave front to the electric field strength of the horizontal polarized wave front measured by each of the receivers with a prescribed value and thereby corrects the azimuth of the vertical polarized wave to be calculated.

In a direct wave directly arriving from an antenna for originating a vertical polarized wave, the electric field strength of the vertical polarized wave front is generally by far greater than the electric field strength of the horizontal polarized wave front. On the other hand, the polarized wave front of a radio wave arriving after being reflected by a mountain or the like is changed due to the reflection, and therefore the difference in electric field strength between the vertical polarized wave front and the horizontal polarized wave front becomes smaller. Since the electric field strength is displayed in decibel (dB), this difference is a ratio of electric field strength in the strict sense of the word.

Since a reflected wave has a smaller ratio of electric field strength than that of a direct wave, if the receiving side compares this ratio with a prescribed value, it is possible to determine whether the incoming radio wave is a direct wave (that is, the direction of the incoming wave is a correct direction) or a reflected wave (that is, the direction of the incoming wave is a false direction). Thus, Patent literature 2 describes the technique capable of accurately determining the direction of the source by eliminating influences of reflected waves.

CITATION LIST

Patent literature

PTL 1
Japanese Patent Application Laid-Open No. 2007-249911
PTL 2
Japanese Patent Application Laid-Open No. 1981-18767

SUMMARY OF INVENTION

Technical Problem

However, even when the technique of patent literature 2 is used, it is difficult to correctly estimate the direction of a source in a road environment. For example, in the case of a radio wave which is originated from a source located out of sight in the shade of a building and arrives after wrapping around the corner of the building (hereinafter referred to as "diffracted wave"), the polarized wave front thereof does not rotate during diffraction. Therefore, the technique of patent literature 2 has difficulty distinguishing between the direct wave and the diffracted wave. Thus, when the source is located out of sight such as in the shade of an object, no direct wave arrives and only diffracted waves and reflected waves arrive, the following problems occur.

[1] It is difficult to determine whether or not a direct wave is arriving. This makes it difficult to determine whether the detection target (source) is located within or out of sight. Thus, upon implementation on a vehicle, the driver is even informed of the existence of a detection target located at a position visually recognizable by the driver, which is annoying to the driver.

[2] There is a possibility that a diffracted wave may be taken for a direct wave and a wrong direction may be indicated as the direction of the source.

It is therefore an object of the present invention to provide an apparatus and method capable of classifying an incoming wave and correctly identifying the position of a transmitter even in a multipath environment.

Solution to Problem

One aspect of an incoming wave classifying and distinguishing apparatus of the present invention adopts a configuration including a first incoming wave detection section that detects a reception level per arrival direction of a vertical polarized wave component included in a multiplexed propagation wave arriving at an antenna, a second incoming wave detection section that detects a reception level per arrival direction of a horizontal polarized wave component included in the multiplexed propagation wave arriving at the antenna, and an incoming wave classifying section that classifies the incoming wave based on the reception level per arrival direction of the multiplexed propagation wave detected by the first and second incoming wave detection sections.

Another aspect of the incoming wave classifying and distinguishing apparatus of the present invention adopts a configuration in which the first and second incoming wave detection sections detect principal wave arrival directions by detecting arrival directions in which maximum reception levels are obtained, the incoming wave classifying section decides, when a difference between the principal wave arrival direction detected by the first incoming wave detection section and the principal wave arrival direction detected by the second incoming wave detection section is within a predetermined threshold, that a direct wave has arrived and decides, when the difference is greater than the threshold, that a direct wave has not arrived.

A further aspect of the incoming wave classifying and distinguishing apparatus of the present invention adopts a configuration in which the incoming wave classifying section decides on the same set arrival directions, when a level difference between the reception level detected by the first incoming wave detection section and the reception level detected by the second incoming wave detection section is within a predetermined threshold, that the incoming wave arriving from the set direction is a direct wave and decides, when the level difference is greater than the threshold and the reception level detected by the first incoming wave detection section is smaller than the reception level detected by the second incoming wave detection section, that the incoming wave arriving from the set direction is a diffracted wave.

One aspect of an originating position estimating apparatus of the present invention adopts a configuration including a first incoming wave detection section that detects a reception level per arrival direction of a vertical polarized wave component included in a multiplexed propagation wave arriving at an antenna, a second incoming wave detection section that detects a reception level per arrival direction of a horizontal polarized wave component included in the multiplexed propagation wave arriving at the antenna, an incoming wave classifying section that classifies an incoming wave based on the respective reception levels per arrival direction of the vertical polarized wave and horizontal polarized wave detected by the first and second incoming wave detection sections and an originating position identifying section that identifies an originating position of a transmitter based on the decision result obtained by the incoming wave classifying section.

Another aspect of the originating position estimating apparatus of the present invention adopts a configuration in which the first and second incoming wave detection sections detect an arrival direction in which a maximum reception level is obtained, thereby detect a principal wave arrival direction respectively, the incoming wave classifying section decides, when a difference between the principal wave arrival direction detected by the first incoming wave detection section and the principal wave arrival direction detected by the second incoming wave detection section is within a predetermined threshold, that a direct wave has arrived and decides, when the difference is greater than the threshold, that a direct wave has not arrived, the originating position identifying section identifies, when the incoming wave classifying section decides that a direct wave has arrived, that the transmitter is located in the direct wave arrival direction and identifies, when the incoming wave classifying section decides that a direct wave has not arrived, that the transmitter is located in a direction other than the direct wave arrival direction.

A further aspect of the originating position estimating apparatus of the present invention adopts a configuration in which regarding the same set arrival direction, the incoming wave classifying section decides, when a level difference between the reception level detected by the first incoming wave detection section and the reception level detected by the second incoming wave detection section is within a predetermined threshold, that the incoming wave arriving from the set direction is a direct wave and decides, when the level difference is greater than the threshold and the reception level detected by the first incoming wave detection section is smaller than the reception level detected by the second incoming wave detection section, that the incoming wave arriving from the set direction is a diffracted wave, the originating position identifying section identifies, when the incoming wave classifying section decides that a direct wave has arrived, that the transmitter exists in the direct wave arrival direction and identifies, when the incoming wave classifying section decides that a diffracted wave has arrived, that the transmitter exists at a position via a diffraction point.

Advantageous Effects of Invention

According to the present invention, it is possible to classify an incoming wave and correctly identify the position of a transmitter even in a multipath environment.

DESCRIPTION OF EMBODIMENTS

Hereinafter, embodiments of the present invention will be described in detail with reference to the accompanying drawings.

(Principles)

First, principles of an embodiment will be described using FIG. 2, FIG. 3 and FIG. 4.

Figure 1B:
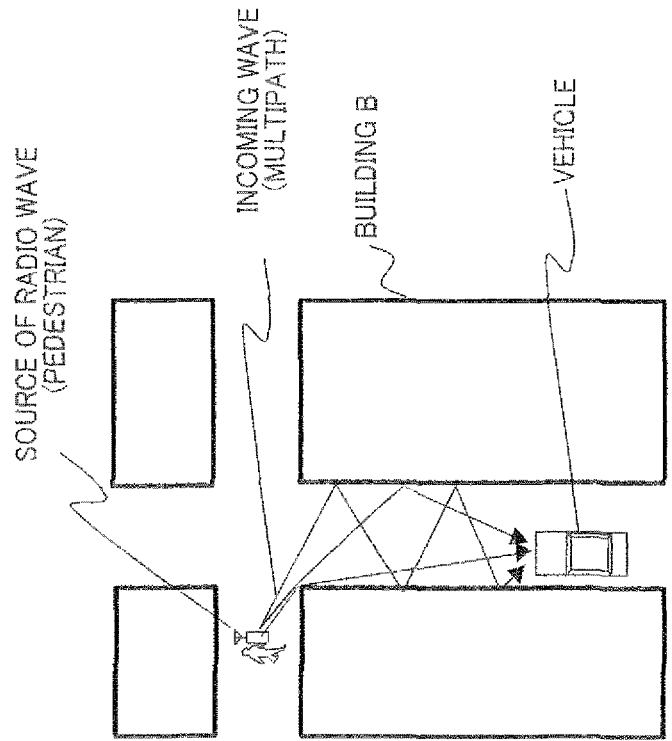
FIG. 1A is a diagram illustrating a synthesized image described in patent literature 1 and FIG. 1B is a diagram illustrating an incoming wave in a multipath environment.
Figure 1A:
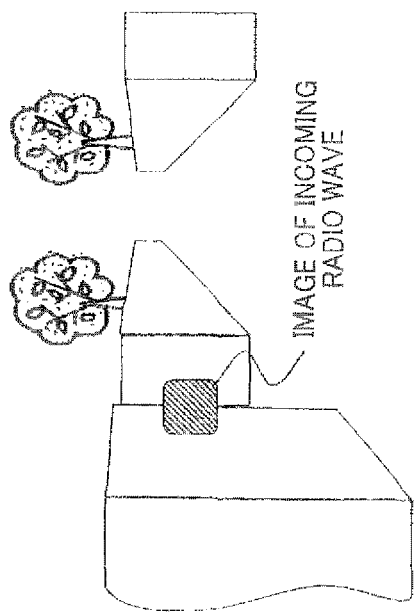
Figure 2:
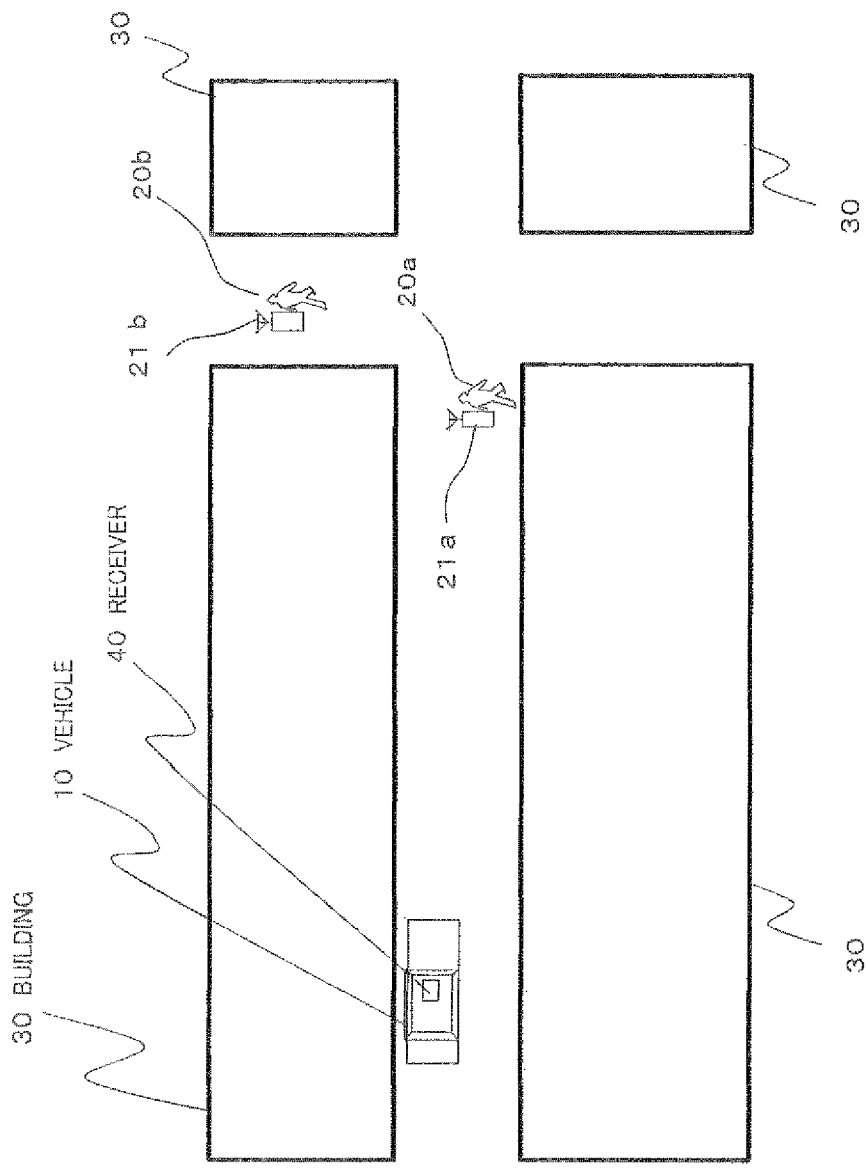
FIG. 2 is a diagram illustrating an example of road environment.
Figure 3:
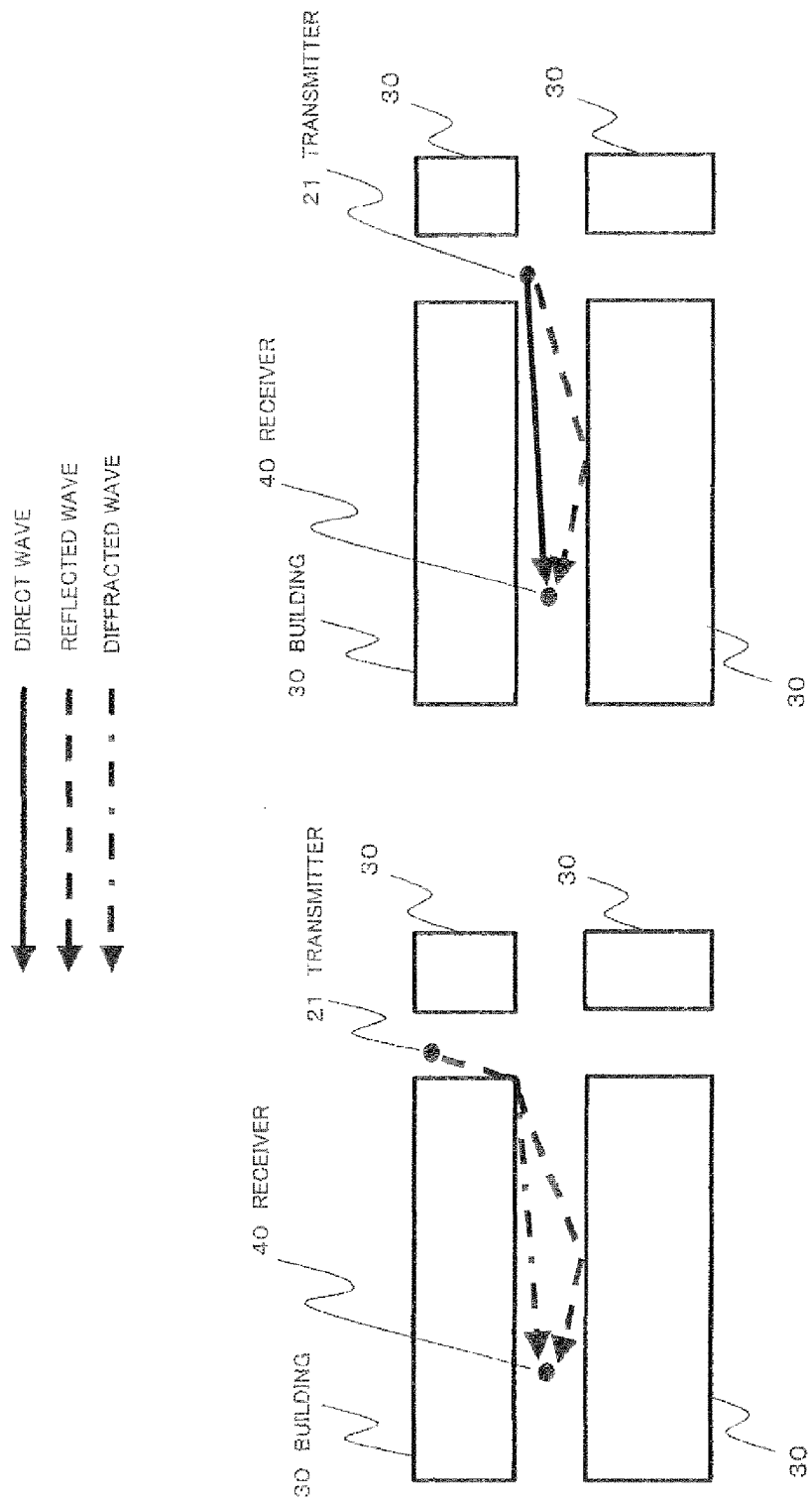
FIG. 3A is a diagram illustrating an incoming wave when a relationship between a transmitter and a receiver is out of sight and FIG. 3B is a diagram illustrating an incoming wave when a relationship between a transmitter and a receiver is within sight.

FIG. 2 and FIG. 3 illustrate road environments. In a road environment, there are vehicle 10, pedestrians 20a and 20b and buildings 30 or the like. Vehicle 10 is mounted with a receiver (vehicle-mounted device) 40 including an incoming wave classifying and distinguishing apparatus and an originating position estimating apparatus which will be described later. Furthermore, pedestrians 20a and 20b carry transmitters 21a and 21b such as mobile phones.

Here, the road environments in FIG. 2 and FIG. 3 assume an intersection surrounded by buildings 30. When radio waves are originated from transmitters 21a and 21b in such an environment, the radio waves become a multiplexed propagation wave, under influences of multipath, and arrive at receiver 40, which is a receiving point, from a plurality of directions.

FIG. 3A illustrates a case where a positional relationship between transmitter 21 and receiver 40 is an out-of-sight relationship and FIG. 3B illustrates a case where a positional relationship between transmitter 21 and receiver 40 is a within-sight relationship.

Here, transmitter 21 is originating a radio wave of a circular polarized wave. That is, the originated radio wave includes a vertical polarized wave component and a horizontal polarized wave component at the same level.

When the positional relationship between transmitter 21 and receiver 40 is blocked by a building and is an out-of-sight relationship as shown in FIG. 3A, no direct wave arrives, but a reflected wave and a diffracted wave arrive at receiver 40.

By the way, a reflection factor of a radio wave on the boundary surface of a medium is expressed as Fresnel's formula and is known to have a polarization dependency. Since a radio wave having arbitrary polarized wave characteristics can be decomposed into two polarized wave components orthogonal to each other, if a case where the incident field is within an incident plane (parallel polarization) is considered distinctively from a case where the incident field is perpendicular to the incident plane (orthogonal polarization), it can be generally said from Fresnel's formula that the reflection factor of the parallel polarization is smaller than the reflection factor of the orthogonal polarization.

Therefore, assuming the height of the antenna above ground level of transmitter 21 is substantially equal to that of receiver 40, of polarized wave components included in a reflected wave from a wall surface perpendicular to ground, the horizontal polarized wave component (corresponding to parallel polarization with respect to a wall surface perpendicular to ground) attenuates more than the vertical polarized wave component (corresponding to orthogonal polarization with respect to a wall surface perpendicular to ground). On the other hand, the attenuation factor during diffraction is also generally known to have a polarization dependency. This causes the vertical polarized wave component to attenuate more largely than the horizontal polarized wave component of the components included in the diffracted wave at an angle in the vertical direction. In a road environment, transmitter 21 may be assumed to have substantially the same height of the antenna above ground level as that of receiver 40.

Figure 4:
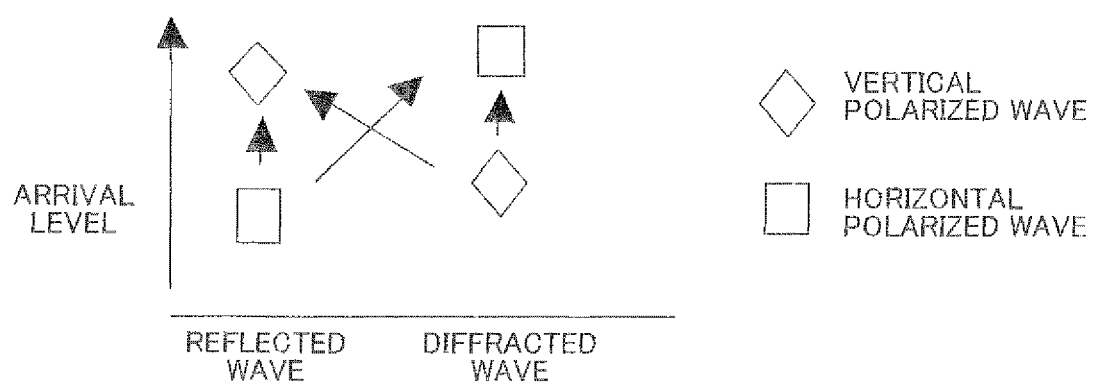
FIG. 4 is a diagram illustrating arrival levels of the vertical polarized wave component and horizontal polarized wave component included in a reflected wave and the vertical polarized wave component and horizontal polarized wave component included in a diffracted wave.

Furthermore, since the aforementioned attenuation factor during diffraction also has a frequency dependency, selecting an appropriate frequency as the frequency of the radio wave emitted from transmitter 21 causes the level of the vertical polarized wave component included in the diffracted wave to become smaller than the level of the vertical polarized wave component included in the reflected wave as shown in FIG. 4, and makes it possible to cause the level of the horizontal polarized wave component included in the diffracted wave to become larger than the level of the horizontal polarized wave component included in the reflected wave. As an example the above described frequency, the inventors confirmed through a simulation that the aforementioned feature could be realized by selecting a UHF band (710 MHz). Since the radio wave in UHF band diffracts to a moderate degree, the UHF band can be said to be a frequency band suitable for application of the present invention.

From this, in the out-of-sight environment shown in FIG. 3A, the arrival direction of the incoming wave (that is, principal wave) of a maximum level is the direction of the reflected wave when attention is focused on the vertical polarized wave component only. On the other hand, the arrival direction of the principal wave is the direction of the diffracted wave when attention is focused on the horizontal polarized wave component only. That is, in the out-of-sight environment, there appears a feature that the arrival direction of the principal wave of the vertical polarized wave component differs from that of the principal wave of the horizontal polarized wave component at receiver 40.

On the other hand, as shown in FIG. 3B, when the positional relationship between transmitter 21 and receiver 40 is a within-sight relationship, a multiplexed reflected wave arriving at receiver 40 always includes a direct wave. Aside from the direct wave, a reflected wave arrives. In the case of the reflected wave, since both the vertical polarized wave component and the horizontal polarized wave component generally attenuate at the time of reflection, both directions of the principal waves of the vertical polarized wave component and the horizontal polarized wave component become the direction of the direct wave. That is, when a direct wave has arrived in an environment within sight, there appears a feature that the arrival direction of the principal wave of the vertical polarized wave component coincides with that of the principal wave of the horizontal polarized wave component at receiver 40.

Although the relationship between transmitter 21 such as mobile phone and receiver 40 has been described as an example here, the above described relationship applies to all transmitting and receivers.

The inventors of the present invention have discovered the above described features as a result of consideration and have come to realize an apparatus and method capable of classifying an incoming wave and correctly identifying the position of a transmitter by utilizing the features even in a multipath environment.

Embodiment 1

Figure 5:
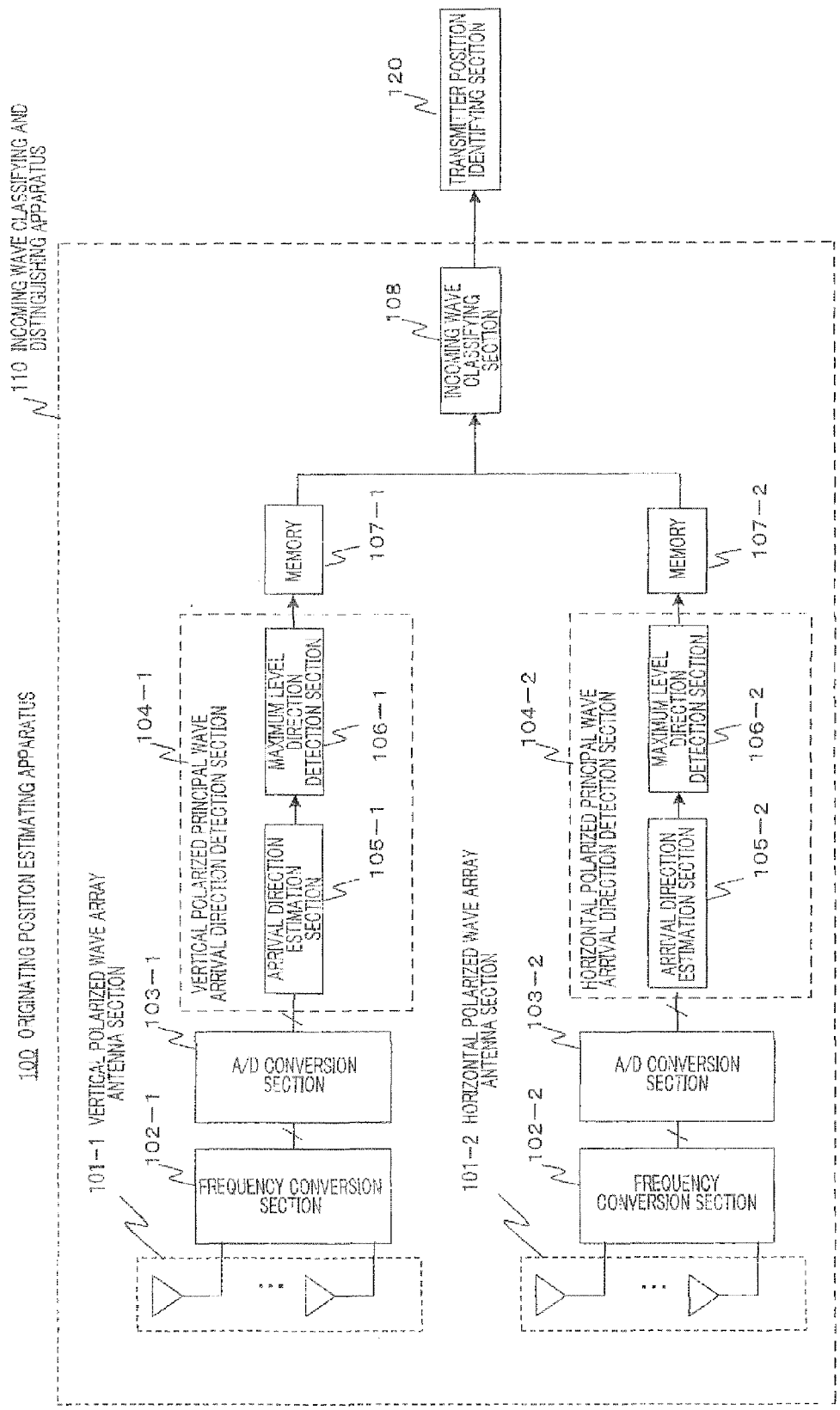
FIG. 5 is a block diagram illustrating a configuration of an originating position estimating apparatus and an incoming wave classifying and distinguishing apparatus according to Embodiment 1.

FIG. 5 as a whole shows a configuration of an originating position estimating apparatus according to Embodiment 1 of the present invention. Originating position estimating apparatus 100 includes incoming wave classifying and distinguishing apparatus 110 and transmitter position identifying section 120.

Incoming wave classifying and distinguishing apparatus 110 receives a radio wave transmitted from a transmitter through vertical polarized wave array antenna section 101-1 and horizontal polarized wave array antenna section 101-2. Vertical polarized wave array antenna section 101-1 is made up of a plurality of antenna elements and receives a vertical polarized wave component. Horizontal polarized wave array antenna section 101-2 is made up of a plurality of antenna elements and receives a horizontal polarized wave component.

The antenna elements of vertical polarized wave array antenna section 101-1 and horizontal polarized wave array antenna section 101-2 are preferably arranged close to each other to an extent that both antenna elements can be regarded to be physically located at substantially the same position.

Signals received by array antenna sections 101-1 and 101-2 are sent to frequency conversion sections 102-1 and 102-2 respectively. Frequency conversion sections 102-1 and 102-2 convert the received signals to frequencies that match the subsequent processing scheme (down-conversion). The frequency-converted analog signals are converted to digital signals by A/D conversion sections 103-1 and 103-2 with synchronization established between all signals. The output of A/D conversion section 103-1 is inputted to vertical polarized principal wave arrival direction detection section 104-1 and the output of A/D conversion section 103-2 is inputted to horizontal polarized principal wave arrival direction detection section 104-2.

Vertical polarized principal wave arrival direction detection section 104-1 differs from horizontal polarized principal wave arrival direction detection section 104-2 only in whether the inputted signal is a signal related to a vertical polarized wave component of the radio wave or a signal related to a horizontal polarized wave component, and both sections apply the same processing to the inputted digital signals. To be more specific, vertical polarized principal wave arrival direction detection section 104-1 and horizontal polarized principal wave arrival direction detection section 104-2 determine arrival directions of principal waves of the respective polarized wave components at the same point in time.

Vertical polarized principal wave arrival direction detection section 104-1 and horizontal polarized principal wave arrival direction detection section 104-2 have arrival direction estimation sections 105-1 and 105-2, and maximum level direction detection sections 106-1 and 106-2 respectively.

Arrival direction estimation sections 105-1 and 105-2 detect the direction of an incoming wave and the reception level of each incoming wave direction using one of known arrival direction estimation algorithms such as beam-former method, CAPON method, MUSIC method. To be more specific, arrival direction estimation sections 105-1 and 105-2 detect arrival directions and reception levels of the respective arrival directions of N incoming waves selected from those having the highest reception levels and output the selected incoming waves. Maximum level direction detection sections 106-1 and 106-2 detect arrival directions corresponding to a maximum reception level and thereby detect the directions of principal waves.

The principal wave arrival direction of the vertical polarized wave component detected by vertical polarized principal wave arrival direction detection section 104-1 is stored in memory 107-1 and the principal wave arrival direction of the horizontal polarized wave component detected by horizontal polarized principal wave arrival direction detection section 104-2 is stored in memory 107-2.

Incoming wave classifying section 108 reads the principal wave arrival direction of the vertical polarized wave component and the principal wave arrival direction of the horizontal polarized wave component at the same point in time from memories 107-1 and 107-2 and compares those arrival directions.

Incoming wave classifying section 108 decides, when the comparison result shows that the principal wave arrival direction of the vertical polarized wave component is different from the principal wave arrival direction of the horizontal polarized wave component, that a direct wave has not arrived for the reason described in the aforementioned section of "principles." By contrast, incoming wave classifying section 108 decides, when the comparison result shows that the principal wave arrival direction of the vertical polarized wave component matches the principal wave arrival direction of the horizontal polarized wave component, that a direct wave has arrived for the reason described in the aforementioned section of "principles."

Since the detection results of vertical polarized principal wave arrival direction detection section 104-1 and horizontal polarized principal wave arrival direction detection section 104-2 include differences in directions due to estimation errors in arrival direction estimation sections 105-1 and 105-2 and differences in installation positions between vertical polarized wave array antenna section 101-1 and horizontal polarized wave array antenna section 101-2, even when the principal waves have actually arrived from the same direction, the detection results may not always match. Taking this into account, incoming wave classifying section 108 decides, when the difference between the principal wave arrival direction detected by vertical polarized principal wave incoming wave detection section 104-1 and the principal wave arrival direction detected by horizontal polarized principal wave incoming wave detection section 104-2 is within a predetermined threshold, that a direct wave has arrived and decides, when the difference is greater than the threshold, that a direct wave has not arrived.

By this means, incoming wave classifying and distinguishing apparatus 110 can decide whether or not the received wave includes a direct wave.

Originating position estimating apparatus 100 inputs the decision result obtained by incoming wave classifying section 108 of incoming wave classifying and distinguishing apparatus 110 to transmitter position identifying section 120.

Transmitter position identifying section 120 decides, upon receiving a decision result showing that a direct wave has not arrived, that the transmitter is located in a place out of sight and decides, upon receiving a decision result showing that a direct wave has arrived, that the transmitter is located in a place within sight.

As described so far, according to the present embodiment, it is possible to correctly decide whether the transmitter (source) exists within sight or out of sight even in an environment in which a multiplexed propagation wave has arrived due to influences of multipath without being confused by reflected waves or diffracted waves and thereby accurately identify the position (direction) of the source.

The present embodiment has been described on the assumption that the transmitter is transmitting a radio wave of circular polarized wave (that is, transmitting a radio wave whose vertical polarized wave component and horizontal polarized wave component are at the same level), but since originating position estimating apparatus 100 and incoming wave classifying and distinguishing apparatus 110 are detecting principal wave arrival directions of the vertical polarized wave component and horizontal polarized wave component separately, the transmitter need not transmit the vertical polarized wave component and the horizontal polarized wave component at the same level and needs only to include both polarized wave components.

Furthermore, the present embodiment uses an array antenna and an arrival direction estimation algorithm to detect the principal wave arrival direction of the vertical polarized wave component and the principal wave arrival direction of the horizontal polarized wave component, but the present invention is not limited to this. That is, once acquiring the principal wave arrival directions of the respective polarized wave components, incoming wave classifying section 108 can decide whether or not a direct wave is included, and therefore narrow directional antennas may be provided for the vertical polarized wave and horizontal polarized wave respectively instead of vertical polarized wave array antenna section 101-1 and horizontal polarized wave array antenna section 101-2 and principal wave arrival directions of their respective polarized wave components may be obtained by simultaneously and physically scanning these antennas at high speed.

Furthermore, a case has been described in the present embodiment where array antenna sections 101-1 and 101-2 are one-dimensional arrays and principal wave arrival direction detection sections 104-1 and 104-2 detect only directions within a horizontal plane, but a configuration may also be adopted in which array antenna sections 101-1 and 101-2 are two-dimensional arrays and principal wave arrival direction detection sections 104-1 and 104-2 can detect principal wave directions in two-dimensional directions. By so doing, it is possible to detect each incoming wave separately from a ground reflected wave, thereby remove influences of fading and detect the principal wave directions more accurately.

Embodiment 2

The incoming wave classifying and distinguishing apparatus according to Embodiment 1 has a feature of making it possible to decide, in an environment in which a multiplexed propagation wave has arrived, whether or not a direct wave has arrived in the multiplexed propagation wave, whereas an incoming wave classifying and distinguishing apparatus which will be described in the present embodiment has a feature of making it possible to identify per direction, in a state in which radio waves arrive from a plurality of directions under influences of multipath, whether radio waves arriving from their respective directions are direct waves or diffracted waves.

Using FIG. 2 again, features of the incoming wave classifying and distinguishing method according to the present embodiment will be described. In the incoming wave classifying and distinguishing method of Embodiment 1, the vertical polarized wave components and the horizontal polarized wave components of radio waves transmitted from transmitters 21a and 21b need not be at the same level and the method has been described as only requiring the inclusion of both polarized wave components. By contrast, the incoming wave classifying and distinguishing method of the present embodiment is different in that a radio wave transmitted from transmitter 21 needs to be a circular polarized wave or needs to include a vertical polarized wave component and a horizontal polarized wave component at the same level.

When the positional relationship between transmitter 21 and receiver 40 is an out-of-sight relationship as shown in FIG. 3A, a reflected wave or diffracted wave arrives at receiver 40. Here, as described in the section of "principles," in the case of a reflected wave from a wall surface perpendicular to ground, if the height of the antenna above ground level of transmitter 21 is substantially the same as that of receiver 40, the electric field component of the vertical polarized wave component is perpendicular to the incident plane, and the vertical polarized wave component is therefore an orthogonal polarized wave, while the electric field component of the horizontal polarized wave component is parallel to the incident plane, and the horizontal polarized wave component is therefore a parallel polarized wave. Furthermore, reflected waves from a plane perpendicular to ground generally have nature that a parallel polarized wave thereof is more likely to attenuate than an orthogonal polarized wave thereof.

That is, radio waves arrive from a plurality of directions in a multipath environment, and when the level of the vertical polarized wave component is compared with the level of the horizontal polarized wave component in the direction in which the reflected wave arrives from among those directions, the vertical polarized wave component is greater for the aforementioned reasons. In other words, incoming waves from a direction in which the level of the horizontal polarized wave component is greater than that of the vertical polarized wave component can be said to be not reflected waves. That is, as shown in FIG. 3A, if only a reflected wave or diffracted wave has arrived, an incoming wave from a direction in which the level of the horizontal polarized wave component is greater than the level of the vertical polarized wave component can be uniquely identified as a diffracted wave.

On the other hand, when the positional relationship between transmitter 21 and receiver 40 is a within-sight relationship as shown in FIG. 3B, a direct wave and a reflected wave arrive at receiver 40. In the case of the reflected wave, the level of the vertical polarized wave component is greater than the level of the horizontal polarized wave component as described above. On the other hand, in the case of the direct wave, since both the vertical polarized wave component and the horizontal polarized wave component are only subject to the same amount of attenuation which is dependent of distances, their levels are the same. Therefore, by comparing level differences between the level of the vertical polarized wave component and the level of the horizontal polarized wave component, it is possible to distinguish the direct wave from other waves (reflected wave).

The incoming wave classifying and distinguishing method of the present embodiment identifies determine whether radio waves arriving from a plurality of directions due to influences of multipath are direct waves or diffracted waves by using such polarized wave characteristics.

Figure 6:
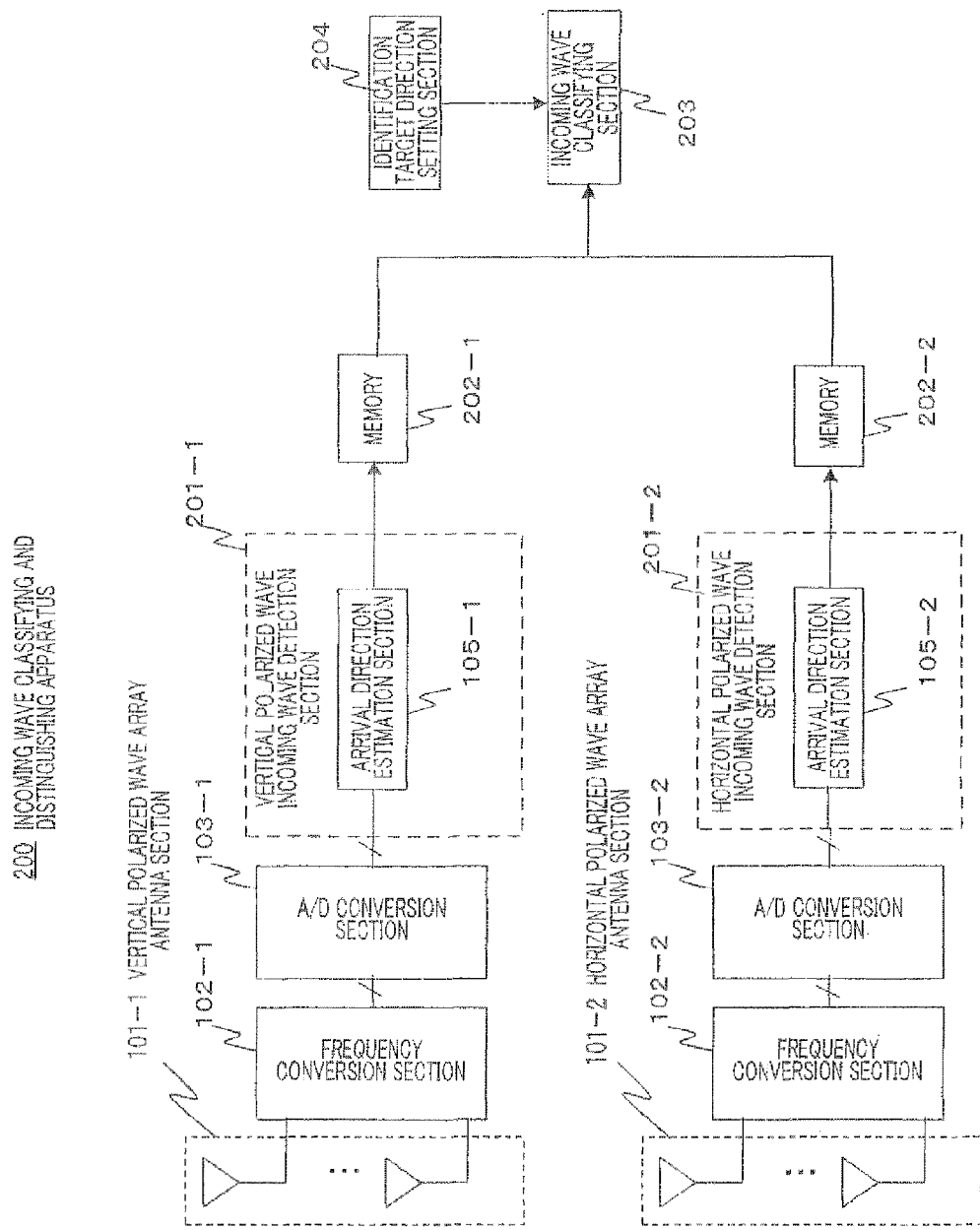
FIG. 6 is a block diagram illustrating a configuration of an incoming wave classifying and a distinguishing apparatus according to Embodiment 2.

Next, the configuration of the present embodiment will be described. FIG. 6 as a whole illustrates a configuration of an incoming wave classifying and distinguishing apparatus according to Embodiment 2 with parts corresponding to those in FIG. 5 assigned the same reference numerals.

Incoming wave classifying and distinguishing apparatus 200 of the present embodiment is different from the configuration of incoming wave classifying and distinguishing apparatus 110 according to Embodiment 1 in the configuration after A/D conversion sections 103-1 and 103-2.

Vertical polarized wave incoming wave detection section 201-1 has arrival direction estimation section 105-1. Arrival direction estimation section 105-1 detects the direction of an incoming wave and the reception level of each incoming wave direction using one of known arrival direction estimation algorithms such as beam-former method, CAPON method and MUSIC method. Vertical polarized wave incoming wave detection section 201-1 outputs the direction of the incoming wave and the reception level of each incoming wave direction detected by arrival direction estimation section 105-1 as a detection result. That is, instead of detecting the direction of the principal wave and outputting the direction of the principal wave as the detection result as in the case of vertical polarized principal wave arrival direction detection section 104-1 of Embodiment 1, vertical polarized wave incoming wave detection section 201-1 outputs the reception level of each incoming wave direction as the detection result.

Horizontal polarized wave incoming wave detection section 201-2 performs processing similar to that of vertical polarized wave incoming wave detection section 201-1 except that the processing target is a horizontal polarized wave component and outputs the reception level in each incoming wave direction detected by arrival direction estimation section 105-2 as a detection result.

The level of each incoming wave direction of the vertical polarized wave component detected by vertical polarized wave arrival direction detection section 201-1 is stored in memory 202-1 and the level of each incoming wave direction of the horizontal polarized wave component detected by horizontal polarized wave arrival direction detection section 201-2 is stored in memory 202-2.

Incoming wave classifying section 203 reads incoming wave levels at the same point in time and in directions specified by identification target direction setting section 204 from memories 202-1 and 202-2. Identification target direction setting section 204 sets an arrival direction of an incoming wave whose radio wave is wished to be classified out of the radio waves detected by vertical polarized wave incoming wave detection section 201-1 and horizontal polarized wave incoming wave detection section 201-2. The incoming wave set by identification target direction setting section 204 need not be a principal wave and may be of an arbitrary direction if it is within a measurable range of incoming wave detection sections 201-1 and 201-2.

Incoming wave classifying section 203 compares the level of the vertical polarized wave component with the level of the horizontal polarized wave component at the same point in time for the direction set by identification target direction setting section 204.

When the level difference between the vertical polarized wave component and the horizontal polarized wave component is within a predetermined range (that is, equal to or below a predetermined threshold), incoming wave classifying section 203 regards their levels to be equal and decides that the radio wave arriving from the direction set by identification target direction setting section 204 is a direct wave.

On the other hand, when the level difference between the vertical polarized wave component and the horizontal polarized wave component exceeds the predetermined range (that is, greater than the predetermined threshold), incoming wave classifying section 203 compares the level of the vertical polarized wave component with the level of the horizontal polarized wave component to decide which is greater. When the comparison result shows that the level of the horizontal polarized wave is greater than the level of the vertical polarized wave, incoming wave classifying section 203 decides that the radio wave arriving from the direction set by identification target direction setting section 204 is a diffracted wave.

Next, operation of incoming wave classifying and distinguishing apparatus 200 will be described using FIG. 7.

When starting incoming wave distinguishing processing in step ST0, incoming wave classifying and distinguishing apparatus 200 detects the signal level of the vertical polarized wave component and the signal level of the horizontal polarized wave component per arrival direction through vertical polarized wave incoming wave detection section 201-1 and horizontal polarized wave incoming wave detection section 201-2 respectively in step ST1.

Next, in step ST2, identification target direction setting section 204 sets the arrival direction of an incoming wave whose radio wave is wished to be classified. In step ST3, incoming wave classifying and distinguishing section 203 compares the level of the vertical polarized wave component with the level of the horizontal polarized wave component in the direction set by identification target direction setting section 204.

In step ST4, incoming wave classifying and distinguishing section 203 decides whether the level of the vertical polarized wave component can be regarded to be equal to the level of the horizontal polarized wave component and moves, when the levels can be regarded to be equal, to step ST6 and decides that a direct wave has arrived.

On the other hand, when a negative result is obtained in step ST4, incoming wave classifying and distinguishing section 203 moves to step ST5 and decides whether or not the level of the horizontal polarized wave is greater than the level of the vertical polarized wave and moves, when an affirmative result is obtained, to step ST7 and decides that a diffracted wave has arrived. When a negative result is obtained in step ST5, incoming wave classifying and distinguishing section 203 moves to step ST8 and decides that a reflected wave has arrived.

As described above, according to the present embodiment, even when radio waves have arrived from a plurality of directions through multipath, it is possible not only to decide whether each radio wave is a direct wave or any wave other than a direct wave but also to identify, when the radio wave is other than a direct wave, whether or not the incoming wave is a diffracted wave. That is, when the radio wave is other than a direct wave, it is possible to determine whether the incoming wave is a diffracted wave or reflected wave. By the way, when each radio wave is a diffracted wave, the arrival direction thereof never deviates significantly from the direction of the source, and it is thereby possible to predict the direction of the source based on the arrival direction. By contrast, when each radio wave is a reflected wave, the arrival direction may deviate extremely from the direction of the source. Thus, since the present embodiment can determine whether or not an incoming wave is a diffracted wave, the present embodiment has an effect that the position of the source can be estimated based on the arrival direction of the diffracted wave in the subsequent position estimation processing.

Embodiment 3

The present embodiment will describe a mode in which originating position estimating apparatus 100 of Embodiment 1 is applied to a traffic accident prevention system.

Figure 8:
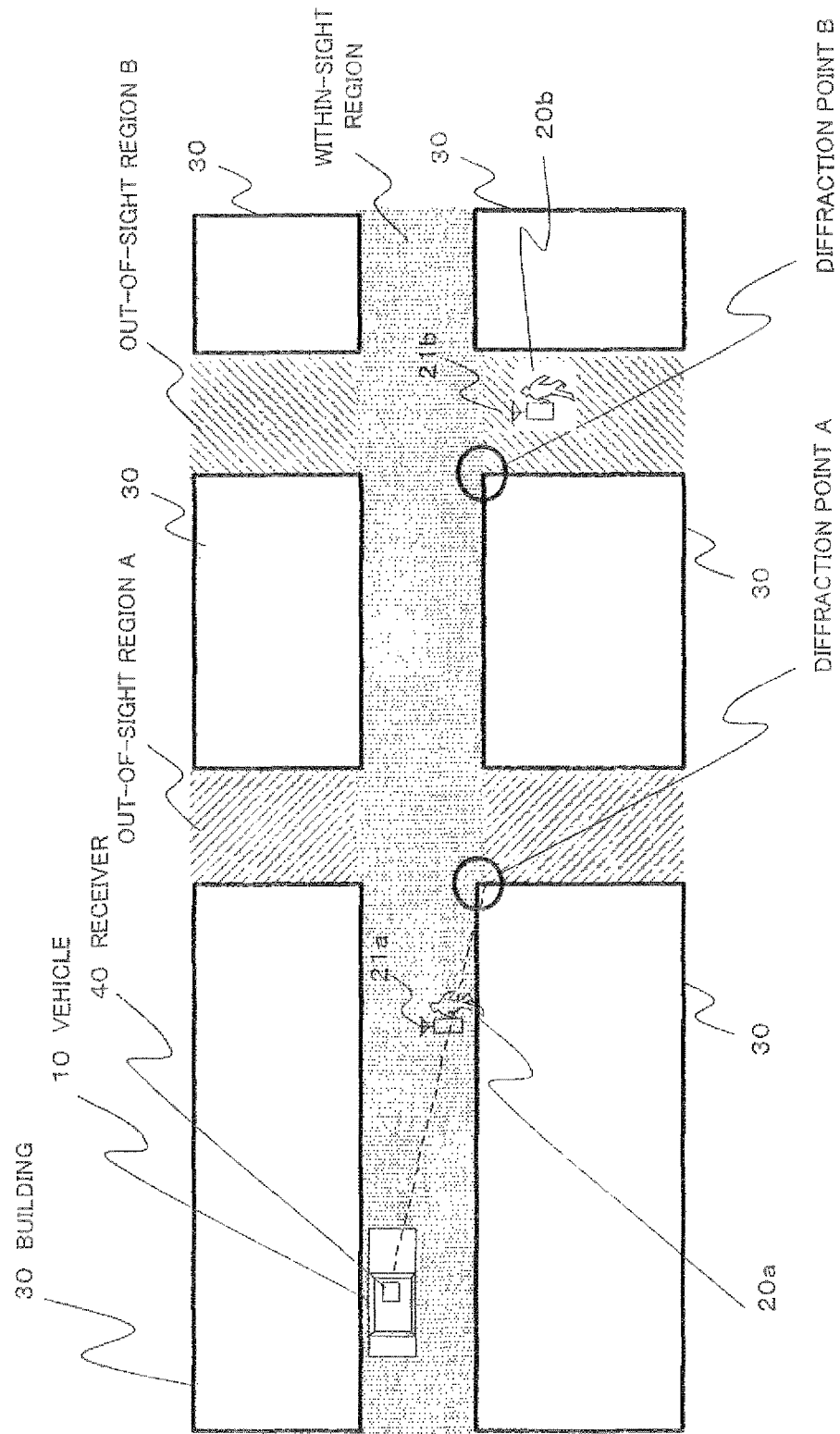
FIG. 8 is a diagram illustrating an example of road environment.

FIG. 8 illustrates an example of road environment. Vehicle 10 is mounted with receiver (vehicle-mounted device) 40 including originating position estimating apparatus 100. Furthermore, pedestrians 20a and 20b carry transmitters 21a and 21b such as mobile phones respectively. Transmitters 21a and 21b may also be mounted on a bicycle or the like in addition to being carried by pedestrians. Thus, warning targets other than pedestrians, that is, bicycles or the like can also be detected. Furthermore, transmitters 21a and 21b may also be carried in objects generally carried by transportation-disadvantaged people on a road such as school bags of pupils, sticks of oldsters.

Transmitters 21a and 21b periodically originate radio waves with intensity that allows the radio waves to reach within a certain distance range. To be more specific, transmitters 21a and 21b transmit UHF band radio waves periodically (e.g., every one second) in all directions from circular polarized wave antennas respectively. That is, radio waves transmitted from transmitters 21a and 21b include vertical polarized wave components and horizontal polarized wave components in equivalent quantities. Frequencies of the radio waves are not limited to the UHF band, and other frequency bands may also be used. Furthermore, as already described in Embodiment 1, transmitters 21a and 21b need not always originate circular polarized radio waves, but may originate radio waves including both polarized wave components.

Furthermore, transmitters 21a and 21b originate radio waves compliant with, for example, a CSMA/CA scheme generally known as a multiple access scheme of wireless LAN or the like. However, radio waves originated by transmitters 21a and 21b are not limited to the CSMA/CA scheme. The scheme used by the plurality of transmitters 21a and 21b is preferably a scheme in which radio waves are not simultaneously originated by the plurality of transmitters 21a and 21b.

The traffic accident prevention system assumed in the present embodiment is a system in which receiver 40 mounted on vehicle 10 detects pedestrians or the like located within a certain distance range, determines whether the pedestrians or the like are located within sight or out of sight when viewed from the driver and appropriately provide danger information to the driver of vehicle 10 according to the identified locations of the pedestrians or the like.

Originating position estimating apparatus 100 (FIG. 2) mounted on receiver 40 of vehicle 10 receives radio waves arriving from transmitters 21a and 21b and determines whether pedestrians 20a and 20b or the like carrying transmitters 21a and 21b are within sight or out of sight of the driver. The principles for originating position estimating apparatus 100 to determine whether pedestrians 20a and 20b are within sight or out of sight have already been described in Embodiment 1.

Originating position estimating apparatus 100 is connected, for example, to a warning apparatus that calls the driver's attention. The warning apparatus is mounted on vehicle 10.

When a detection target such as pedestrian 20a in FIG. 8 is located within sight of vehicle 10, a direct wave arrives at vehicle 10, and therefore originating position estimating apparatus 100 can detect the accurate direction in which pedestrian 20a is located based on the arrival direction of the direct wave. When originating position estimating apparatus 100 identifies the position (direction) of pedestrian 20a, the information is sent to the warning apparatus. Regarding pedestrian 20 located within sight, the warning apparatus calls the driver's attention to a minor degree, for example, "there is a pedestrian within sight ahead on the right" in voice.

On the other hand, when originating position estimating apparatus 100 detects that there is a pedestrian such as pedestrian 20b in FIG. 8 out of sight, the warning apparatus calls the driver's attention "there is an unseen pedestrian, CAUTION!" in louder voice than in the case of the pedestrian within sight.

A case has been described here where a warning is given as to the "presence of a pedestrian or the like within sight" or the "presence of a pedestrian or the like out of sight" as an example, but the warning method is not limited to this. For example, a warning method using a display, a warning method using light or a warning method using vibration may also be used.

As described above, the present embodiment uses originating position estimating apparatus 100 of Embodiment 1 and can thereby realize a traffic accident prevention system in a simple configuration capable of providing the driver with information as to whether or not there is a dangerous target within sight of the driver.

That is, according to the present embodiment, it is possible to provide the driver with information as to whether or not there is a dangerous target within sight of the driver without the detection target such as pedestrian carrying any expensive position identifying means in a complicated configuration such as GPS (Global Positioning System) but only carrying an inexpensive radio wave transmitter.

Embodiment 4

The present embodiment will describe an originating position estimating apparatus using incoming wave classifying and distinguishing apparatus 200 of Embodiment 2 and a traffic accident prevention system using the originating position estimating apparatus.

Figure 9:
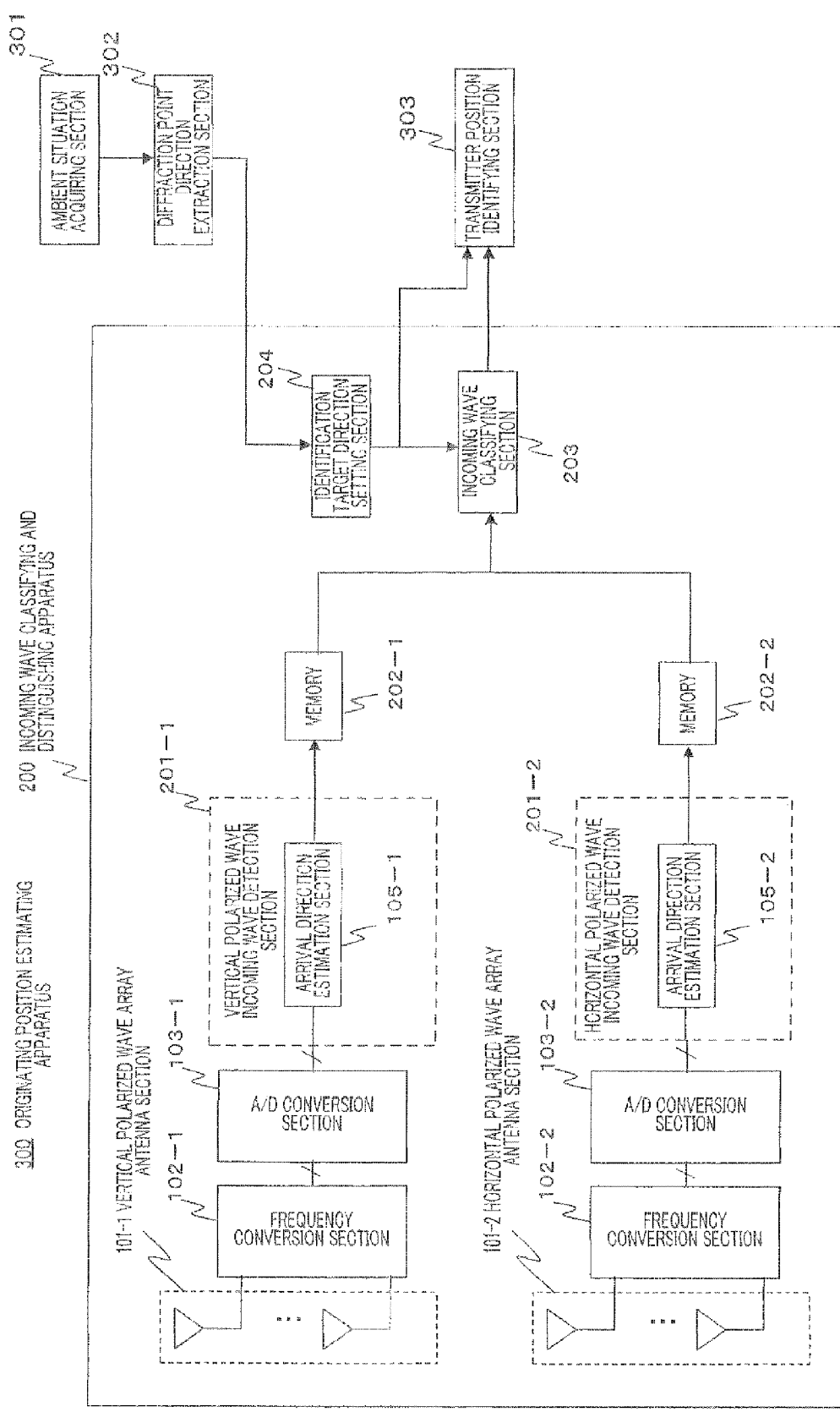
FIG. 9 is a block diagram illustrating a configuration of an originating position estimating apparatus according to Embodiment 3.

FIG. 9 illustrates a configuration of originating position estimating apparatus 300 of the present embodiment with parts corresponding to those in FIG. 6 assigned the same reference numerals. Originating position estimating apparatus 300 includes incoming wave classifying and distinguishing apparatus 200 of Embodiment 2, ambient situation acquiring section 301, diffraction point direction extraction section 302 and transmitter position identifying section 303.

Ambient situation acquiring section 301 is intended to acquire an ambient situation in which a vehicle is running and particularly acquire information on the ambient situation ahead of the vehicle. To be more specific, ambient situation acquiring section 301 is an imaging apparatus using a vehicle-mounted camera, radar apparatus, map information reading apparatus of car navigation or the like.

Diffraction point direction extraction section 302 extracts a direction of an edge of an obstacle from which a pedestrian may dash out from information on the ambient situation ahead of the vehicle extracted by ambient situation acquiring section 301 and sends the direction of the edge as the diffraction point direction to identification target direction setting section 204.

Identification target direction setting section 204 selects diffraction point directions one by one from among a plurality of diffraction point directions extracted by diffraction point direction extraction section 302 and sends the selected diffraction points to incoming wave classifying section 203 as identification target direction setting information.

Figure 7:
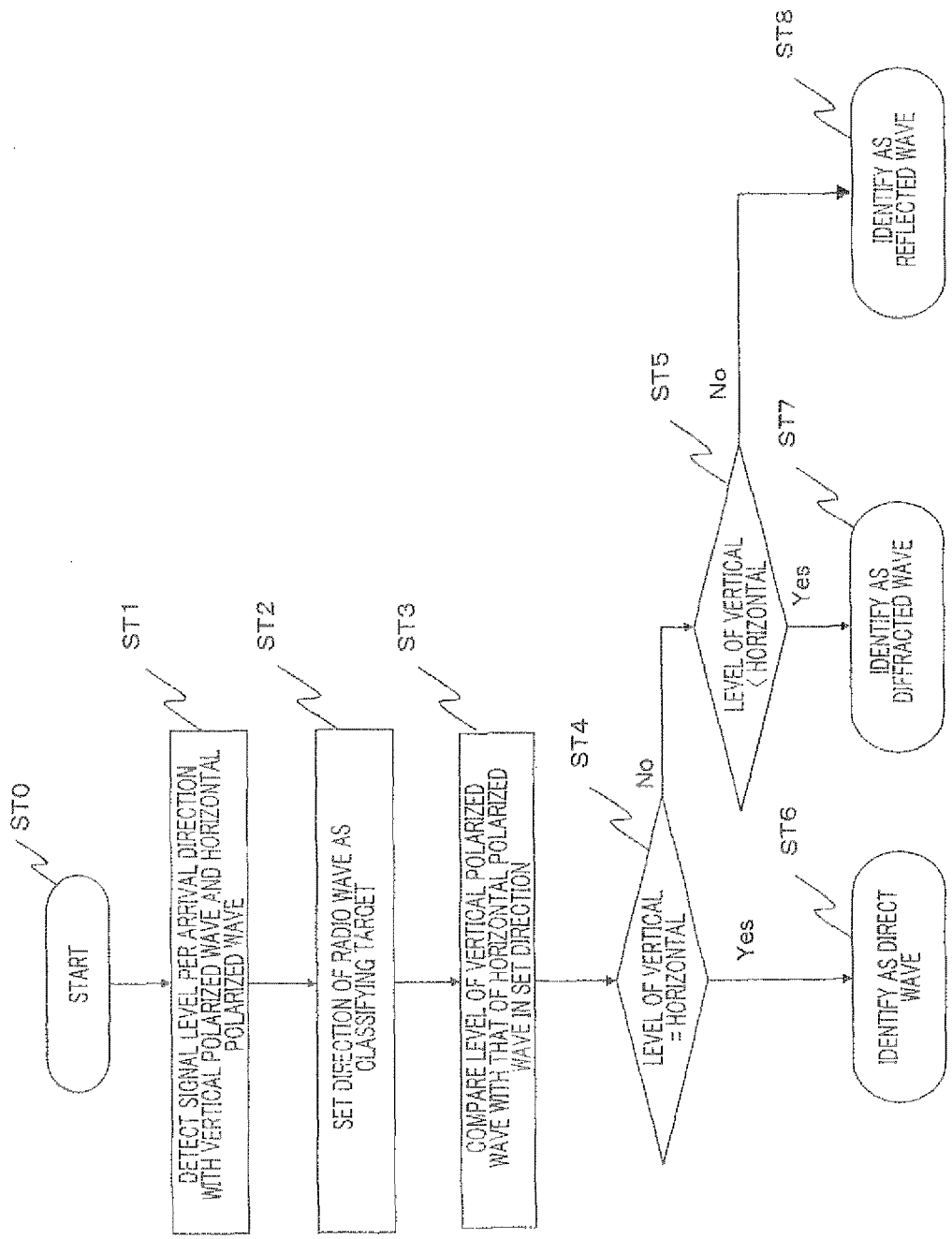
FIG. 7 is a flowchart illustrating operations of the incoming wave classifying and distinguishing apparatus of Embodiment 2.

Transmitter position identifying section 303 identifies the position (direction) of the transmitter based on the diffraction point direction set by identification target direction setting section 204 and incoming wave classification information decided by incoming wave classifying section 203 (see FIG. 7).

More specific operation of originating position estimating apparatus 300 will be described using FIG. 8.

First, a case will be described where diffraction point A in FIG. 8 is extracted by diffraction point direction extraction section 302. Diffraction point A is an edge from which a radio wave is predicted to arrive after being diffracted when a radio wave source (transmitter carried by a pedestrian in the present embodiment) is located somewhere in out-of-sight region A shown by the area with left-to-right diagonal lines in FIG. 8. In the example in FIG. 8, since there is no transmitter in out-of-sight region A, no diffracted wave arrives from diffraction point A. However, when viewed from vehicle 10, since pedestrian 20a is located in the same direction as the direction from which the diffracted wave is predicted to arrive, a radio wave arrives from this direction.

Originating position estimating apparatus 300 of the present embodiment classifies the radio wave arriving from this direction through incoming wave classifying and distinguishing apparatus 200. In the case of the positional relationship in FIG. 8, originating position estimating apparatus 300 can decide that a direct wave has arrived but no diffracted wave has arrived from the direction of diffraction point A. Therefore, transmitter position identifying section 304 of originating position estimating apparatus 300 can not only identify that pedestrian 20a is located at a position within sight in the direction of diffraction point A, that is, a position visually recognizable by the driver, but also decide that no pedestrian is located in at least out-of-sight region A.

Next, a case will be described where diffraction point direction extraction section 302 has extracted diffraction point B in FIG. 8. Diffraction point B is an edge from which a radio wave is predicted to arrive after being diffracted when a radio wave source is located somewhere in out-of-sight region B shown by the area with left-to-right rising lines in FIG. 8. In the example in FIG. 8, since there is pedestrian 20b in out-of-sight region B, a diffracted wave arrives from diffraction point B.

Originating position estimating apparatus 300 can decide through incoming wave classifying and distinguishing apparatus 200 that the radio wave arriving from the direction of diffraction point B is a diffracted wave. This allows originating position identifying section 303 of originating position estimating apparatus 300 to identify in which part of out-of-sight region B pedestrian 20b is located.

As described so far, originating position estimating apparatus 300 of the present embodiment can not only correctly decide whether a detection target such as pedestrian is located in a region within sight or out of sight, but also narrow down, when the detection target is located in the out-of-sight region, the out-of-sight region such as whether the detection target is located in out-of-sight region A or out-of-sight region B and identify the location.

By applying originating position estimating apparatus 300 of the present embodiment to a traffic accident prevention system as described in Embodiment 3, even when a pedestrian or the like is located in an out-of-sight region, the driver of the vehicle can recognize the presence of the pedestrian, and further narrow down the out-of-sight region in which the pedestrian or the like is located, and can thereby reduce the possibility of accident when driving along a road where there are many out-of-sight regions such as a busy street and there is a high possibility that pedestrians or the like may be located who are hard to be visually recognized. Furthermore, the present embodiment can perform an operation of not reporting, when a pedestrian or the like is located at a position visually recognizable, the presence of the pedestrian to the driver but reporting, only when a pedestrian or the like is located in an out-of-sight region, the presence of the pedestrian to the driver, and can thereby realize a traffic accident prevention system that dissolves the annoyance to the driver.

In the present embodiment, ambient situation acquiring section 301 and diffraction point direction extraction section 302 are provided outside incoming wave classifying and distinguishing apparatus 200, but ambient situation acquiring section 301 and diffraction point direction extraction section 302 may also be provided inside incoming wave classifying and distinguishing apparatus 200.

The above embodiments have described the originating position estimating apparatus as a vehicle-mounted device, but the originating position estimating apparatus may also be installed on a road or on the side of a road.

The disclosure of Japanese Patent Application No. 2008-258918, filed on Oct. 3, 2008, including the specification, drawings and abstract is incorporated herein by reference in its entirety.

INDUSTRIAL APPLICABILITY

The present invention has an advantage of being able to classify an incoming wave and correctly identify the position of a transmitter even in a multipath environment, and is suitably applicable to a traffic accident prevention system or the like.

The invention claimed is:

1. An incoming wave classifying and distinguishing apparatus comprising:
    a first incoming wave detection section that detects a reception level, per arrival direction of a vertical polarized wave component included in a multiplexed propagation wave arriving at an antenna;
    a second incoming wave detection section that detects a reception level, per arrival direction of a horizontal polarized wave component included in the multiplexed propagation wave arriving at the antenna; and
    an incoming wave classifying section that determines whether or not a direct wave has arrived from an arbitrary direction based on the detected reception level of the vertical polarized wave component and the detected reception level of the horizontal polarized wave component.

2. The incoming wave classifying and distinguishing apparatus according to claim 1, wherein:
    the first and second incoming wave detection sections detect a principal wave arrival direction by detecting an arrival direction in which a maximum reception level is obtained; and
    the incoming wave classifying section decides, when a difference between a principal wave arrival direction detected by the first incoming wave detection section and a principal wave arrival direction detected by the second incoming wave detection section is within a predetermined threshold, that a direct wave has arrived and decides, when the difference is greater than the threshold, that a direct wave has not arrived.

3. The incoming wave classifying and distinguishing apparatus according to claim 1, wherein regarding the same set arrival direction, the incoming wave classifying section decides, when a level difference between a reception level detected by the first incoming wave detection section and a reception level detected by the second incoming wave detection section is within a predetermined threshold, that the incoming wave arriving from the set direction is a direct wave, or decides, when the level difference is greater than the threshold and the reception level detected by the first incoming wave detection section is smaller than the reception level detected by the second incoming wave detection section, that the incoming wave arriving from the set direction is a diffracted wave.

4. The incoming wave classifying and distinguishing apparatus according to claim 3, wherein the incoming wave classifying section further decides, regarding the same set arrival direction, when the level difference is greater than the threshold and the reception level detected by the first incoming wave detection section is equal to or above the reception level detected by the second incoming wave detection section, that the incoming wave arriving from the set direction is a reflected wave.

5. The incoming wave classifying and distinguishing apparatus according to claim 3, further comprising:
   an ambient situation acquiring section that acquires an ambient situation;
   a diffraction point direction extraction section that extracts a direction of a diffraction point from which a radio wave is predicted to arrive after being diffracted from the ambient situation acquiring section; and
   a target direction setting section that sets a decision target direction by the incoming wave classifying section in the direction of the diffraction point.

6. The incoming wave classifying and distinguishing apparatus according to claim 4, further comprising:
   an ambient situation acquiring section that acquires an ambient situation;
   a diffraction point direction extraction section that extracts a direction of a diffraction point from which a radio wave is predicted to arrive after being diffracted from the ambient situation acquiring section; and
   a target direction setting section that sets a decision target direction by the incoming wave classifying section in the direction of the diffraction point.

7. An originating position estimating apparatus comprising:
   a first incoming wave detection section that detects a reception level per arrival direction of a vertical polarized wave component included in a multiplexed propagation wave arriving at an antenna;
   a second incoming wave detection section that detects a reception level per arrival direction of a horizontal polarized wave component included in the multiplexed propagation wave arriving at the antenna;
   an incoming wave classifying section that classifies determines whether or not a direct wave has arrived from an arbitrary direction based on the detected reception level of the vertical polarized wave and the detected reception level of the horizontal polarized wave; and
   an originating position identifying section that identifies an originating position of a transmitter based on the decision result obtained by the incoming wave classifying section.

8. The originating position estimating apparatus according to claim 7, wherein the first and second incoming wave detection sections detect a principal wave arrival direction by detecting an arrival direction in which a maximum reception level is obtained, the incoming wave classifying section decides, when a difference between the principal wave arrival direction detected by the first incoming wave detection section and the principal wave arrival direction detected by the second incoming wave detection section is within a predetermined threshold, that a direct wave has arrived and decides, when the difference is greater than the threshold, that a direct wave has not arrived, and the originating position identifying section identifies, when the incoming wave classifying section decides that a direct wave has arrived, that the transmitter is located in the arrival direction of the direct wave and identifies, when the incoming wave classifying section decides that a direct wave has not arrived, that the transmitter is located in a direction other than the arrival direction of the direct wave.

9. The originating position estimating apparatus according to claim 7, wherein:
   regarding the same set arrival direction, the incoming wave classifying section decides, when a level difference between the reception level detected by the first incoming wave detection section and the reception level detected by the second incoming wave detection section is within a predetermined threshold, that the incoming wave arriving from the set direction is a direct wave, or decides, when the level difference is greater than the threshold and the reception level detected by the first incoming wave detection section is smaller than the reception level detected by the second incoming wave detection section, that the incoming wave arriving from the set direction is a reflected wave; and
   the originating position identifying section identifies, when the incoming wave classifying section decides that a direct wave has arrived, that the transmitter is located in the arrival direction of the direct wave and identifies, when the incoming wave classifying section decides that a diffracted wave has arrived, that the transmitter is located at a position via a diffraction point.

10. The originating position estimating apparatus according to claim 9, further comprising:
   an ambient situation acquiring section that acquires an ambient radio wave propagation situation;
   a diffraction point direction extraction section that extracts a direction of a diffraction point from which a radio wave is predicted to arrive after being diffracted from the ambient situation acquiring section; and
   a target direction setting section that sets a decision target direction by the incoming wave classifying section in the direction of the diffraction point.

11. An incoming wave classifying and distinguishing method comprising:
   detecting a reception level per arrival direction of a vertical polarized wave component included in a multiplexed propagation wave arriving at an antenna;
   detecting a reception level per arrival direction of a horizontal polarized wave component included in the multiplexed propagation wave arriving at the antenna; and
   determining whether or not a direct wave has arrived from an arbitrary direction based on the detected reception level of the vertical polarized wave and the detected reception level of the horizontal polarized wave.

12. An originating position estimating method comprising:
   detecting a reception level per arrival direction of a vertical polarized wave component included in a multiplexed propagation wave arriving at an antenna;
   detecting a reception level per arrival direction of a horizontal polarized wave component included in the multiplexed propagation wave arriving at the antenna;
   determining whether or not a direct wave has arrived from an arbitrary direction based on the detected reception level of the vertical polarized wave and the detected reception level of the horizontal polarized wave; and identifying an originating position of a transmitter based on the decision result obtained in the determining whether or not a direct wave has arrived from the arbitrary direction.

\* \* \* \* \*